A. J. PAROUBEK.
METAL SEAL AND FASTENER.
APPLICATION FILED JUNE 1, 1918.
1,301,310. Patented Apr. 22, 1919.
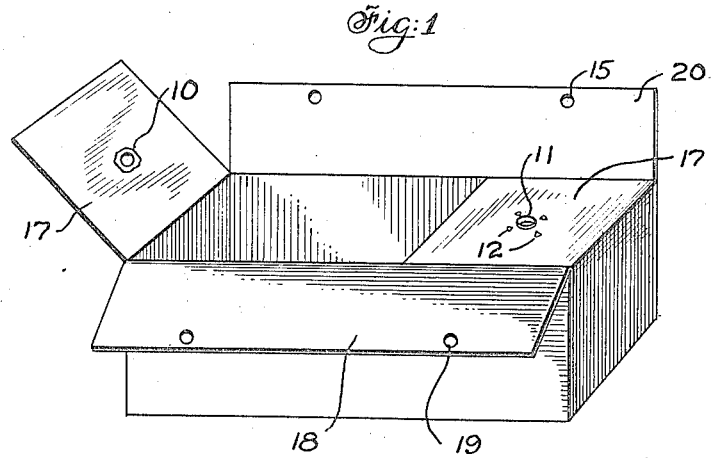
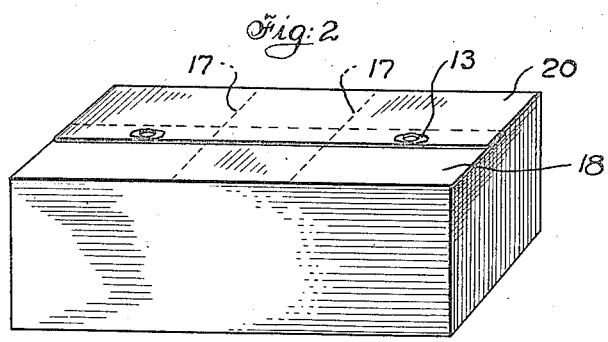
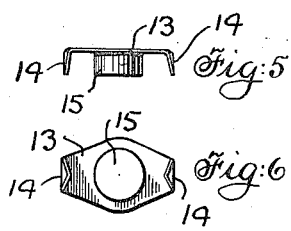
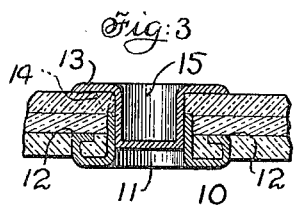
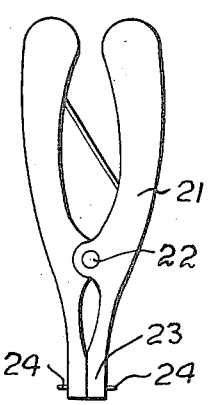
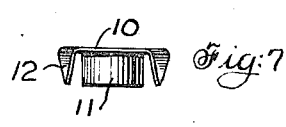
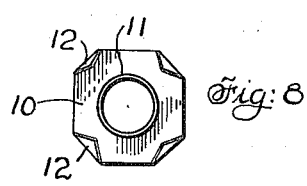
Inventor,
Anton J. Paroubek.
By his Attorney
W. P. Hutchinson

UNITED STATES PATENT OFFICE.

ANTON J. PAROUBEK, OF BEACON, NEW YORK, ASSIGNOR TO AMERICAN METAL SEAL COMPANY, OF BEACON, NEW YORK, A FIRM CONSISTING OF ANTON J. PAROUBEK AND HENRY HURLIMANN.

METAL SEAL AND FASTENER.

1,301,310.     Specification of Letters Patent.     Patented Apr. 22, 1919.

Application filed June 1, 1918. Serial No. 237,714.

*To all whom it may concern:*

Be it known that I, ANTON J. PAROUBEK, a citizen of the United States, and a resident of Beacon, Dutchess county, New York, have invented a new and useful Improvement in Metal Seals and Fasteners, of which the following is a full, clear, and exact description.

My invention relates to improvements in sealing and fastening devices, and the object of my invention is to produce a simple, cheap and efficient metal seal which can be easily applied to a box to be sealed or members to be fastened together, and which when sealed cannot be separated without disrupting the fastening. My invention is especially intended to produce a seal and fastener of this kind which is composed of two members having tubular portions, one member being fastened to one part and the second member to another part, the two parts being intended to be secured, and which has the tubular portion of one member of the fastener adapted to enter the corresponding portion of the opposite member, after which pressure is applied laterally to the inner tube causing a portion of its wall to be pushed out into the wall of the outer tube, thus securing the opposite members of the fastener and seal permanently together. The invention is intended also to produce a fastener and seal of this kind which cannot be tampered with, and in which the opposite members above referred to when applied to laminated or fibrous matter serves to bind the several laminæ or layers together. Thus a package sealed with this fastener and seal cannot be opened by splitting the laminæ and then sealing it up, but can only be opened by breaking the package.

Reference is to be had to the accompanying drawings forming a part of this specification, in which similar reference characters indicate corresponding parts in all the views.

Figure 1 is a perspective of an open box provided with my improved fastener and seal.

Fig. 2 is a perspective of the same box sealed.

Fig. 3 is a cross section through the fastener and seal showing the members in position to be locked together.

Fig. 4 is a view similar to Fig. 3 showing the members actually locked together.

Fig. 5 is a side elevation of the outer member of the fastener.

Fig. 6 is an inverted plan of the structure shown in Fig. 5.

Fig. 7 is a side elevation of the inner member of the fastener.

Fig. 8 is a plan view of the member shown in Fig. 7, and

Fig. 9 is a view of a tool which can be conveniently used for locking the members of the fastener together.

The fastener comprises two members which are preferably made of sheet metal. The inner member has a base portion 10 which is essentially flat and from which rises a central tube 11. It also has upturned prongs 12. Thus the tube 11 can be forced through the paper, or other material to which the fastener is to be attached, the prongs 12 are likewise forced through the material, and the prongs can then be doubled over as shown in Figs. 3 and 4, thus firmly securing this member of the fastener in place, while the prongs also serve to bind the laminæ or layers of the material to which the member is applied. The outer member of the fastener comprises likewise a flat base 13 having prongs 14 by which it can be secured to the material as already described, and a metal tube 15 which is adapted to enter the tube 11, this metal tube being preferably though not necessarily closed at its inner end.

In Figs. 1 and 2 I have shown the application of the invention, but it will be understood of course that the device can be applied to a great variety of boxes or envelops or containers, or in fact can be used generally for fastening adjacent parts of flexible or fibrous material together. In the figures referred to the box has inturned end flaps 17 to which the inner members of the fastener and seal are applied, one being applied to each flap by forcing the tube 11 through the flap at the under side and securing the member by means of the prongs 12 as already described. The second flap 18 is adapted to turn in over the flaps 17, and this has holes 19 adapted to receive the tubes 11. The outer flap 20 is adapted to fold over the three flaps 17 and 18, and this carries the outer member of the fastener with the tube 15 projecting through the flap from the top so as to register with the tube 11 of the inner member of the fastener. After the box is closed and the tubes 15 of the fastening devices pushed into the tubes 11, the wall of each tube 15 is then for a portion of its distance pushed out laterally so as to embed itself in a corresponding impression in the tube 11 thus locking the parts together.

To do this conveniently a tool is necessary, and I have shown a suitable tool in Fig. 9. Here the handles 21 are pivoted at 22 so that the free ends 23 of the two members of the tool can separate. These members are adapted to enter the tube 15 and are provided on their opposite surfaces with pins 24 which are adapted to crush through the wall of the tube 15 and the wall of the tube 11 as shown at 16 in Fig. 4, this act causing the metal of the tube 15 to be pushed into the hole made by the tool in the tube 11, and the two fastening members are thus locked so that they cannot be pulled apart, while the box is thereby perfectly sealed. It will be seen therefore that the box can only be opened by breaking the package.

It will be noticed that the seal and fastener is a structure of the greatest cheapness and simplicity, easily applied, and that it can be used for a great variety of fastening and sealing purposes. It is my understanding also that the method of fastening by binding the two tubes together and then crushing the wall of one into the other, said members being attached to parts to be fastened or sealed, is a new idea in the art.

I claim:—

1. A seal and fastener comprising two opposed and separate members each adapted for attachment to a sheet of fibrous or flexible material, one member comprising a base portion having fastening prongs thereon and a tubular portion, and the second member having likewise fastening prongs and a tubular portion adapted to enter the tubular part of the first member, the tubes being of thin material which permits a portion of the wall of one to be crushed into the wall of the other to lock them together.

2. A fastener and seal comprising two opposed members one having a tube and means for securing it to a flap or the like, and the second member having likewise a tube adapted to enter the tube of the first member, and means for fastening the tube to a flap or the like, the tubes being of comparatively thin metal, whereby a portion of the inner tube wall can be pushed into a corresponding portion of the outer tube wall.

3. A fastener and seal composed of two separate members one comprising a flat base portion having fastening prongs thereon and a tubular portion rising from the base portion, and a second member comprising likewise a base portion with fastening devices thereon and a tubular portion adapted to enter the tube of the first member, both tubes being of thin material whereby a portion of the wall of one can be forced into a corresponding portion of the wall of the other.

4. The herein described method of fastening opposed parts together which consists in securing a tube to one of said parts, securing to the second of said parts a second tube adapted to enter the first tube, and then crushing out a portion of the wall of the inner tube so as to embed it in a corresponding part of the outer tube.

ANTON J. PAROUBEK.

Witnesses:
  JOHN P. HANNON,
  JOSEPH ZALLETTA.